(12) United States Patent
Li et al.

(10) Patent No.: US 11,721,918 B2
(45) Date of Patent: Aug. 8, 2023

(54) ELECTRICAL CONNECTOR WITH STACKED CONDUCTIVE SHEET TERMINALS

(71) Applicant: Tyco Electronics (Shanghai) Co. Ltd., Shanghai (CN)

(72) Inventors: Hua Li, Shanghai (CN); Guangming Zhao, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 64 days.

(21) Appl. No.: 17/109,277

(22) Filed: Dec. 2, 2020

(65) Prior Publication Data
US 2021/0175645 A1 Jun. 10, 2021

(30) Foreign Application Priority Data
Dec. 5, 2019 (CN) .......................... 201911270316.1

(51) Int. Cl.
| | | |
|---|---|---|
| *H01R 4/48* | (2006.01) | |
| *H01R 9/24* | (2006.01) | |
| *H02B 1/20* | (2006.01) | |
| *H01R 13/20* | (2006.01) | |
| *H01R 13/629* | (2006.01) | |
| *H01R 13/502* | (2006.01) | |

(52) U.S. Cl.
CPC ............ *H01R 9/2458* (2013.01); *H01R 4/48* (2013.01); *H01R 13/20* (2013.01); *H01R 13/502* (2013.01); *H01R 13/629* (2013.01); *H02B 1/205* (2013.01)

(58) Field of Classification Search
CPC ........ H01R 9/2458; H01R 4/48; H01R 13/20; H01R 13/502; H01R 13/629; H01R 13/2442; H01R 12/716; H01R 12/721; H02B 1/205
See application file for complete search history.

(56) References Cited

U.S. PATENT DOCUMENTS

| | | | | |
|---|---|---|---|---|
| 3,199,066 A | * | 8/1965 | Eledge ................. | H01R 12/716 439/857 |
| 3,201,556 A | * | 8/1965 | Baird ....................... | H01H 1/42 200/282 |
| 3,233,208 A | * | 2/1966 | Gordon ................ | H01R 12/721 439/748 |
| 4,075,759 A | * | 2/1978 | Sochor .................. | H01R 43/20 439/636 |
| 4,220,382 A | * | 9/1980 | Ritchie ............. | H01R 12/7088 439/267 |
| 4,423,917 A | * | 1/1984 | Scheingold ........ | H01R 13/6315 439/249 |
| 4,734,041 A | * | 3/1988 | Bruchmann ........... | H01R 12/82 439/924.1 |

(Continued)

*Primary Examiner* — Thanh Tam T Le
(74) *Attorney, Agent, or Firm* — Barley Snyder (57) ABSTRACT

An electrical connector includes a plurality of sheet terminals each having a main body and at least a pair of cantilevers. Each pair of the cantilevers extends from at least one of a first side and an opposite second side of the main body and has a pair of contact portions protruding toward each other inside a pair of free ends of the pair of cantilevers. The plurality of sheet terminals are assembled together in a stacked manner and a receiving chamber with an insertion opening is formed between the pair of cantilevers of the plurality of sheet terminals.

17 Claims, 7 Drawing Sheets

(56) References Cited

U.S. PATENT DOCUMENTS

| | | | | |
|---|---|---|---|---|
| 4,973,132 A * | 11/1990 | McDonald | G02B 5/3083 | 359/13 |
| 5,024,627 A * | 6/1991 | Bennett | H01R 12/721 | 439/631 |
| 5,052,953 A * | 10/1991 | Weber | H01R 12/718 | 439/857 |
| 5,086,372 A * | 2/1992 | Bennett | H01R 12/7088 | 361/802 |
| 5,975,959 A * | 11/1999 | Joly | G06K 7/0021 | 439/885 |
| 6,024,611 A * | 2/2000 | Giuseppe | H02B 11/04 | 439/819 |
| 7,168,990 B2 * | 1/2007 | Suzuki | H01R 13/112 | 439/267 |
| 7,845,985 B2 * | 12/2010 | Brunker | H01R 12/732 | 439/631 |
| 7,909,663 B1 * | 3/2011 | Bouffet | H01R 13/18 | 439/787 |
| 8,047,875 B2 * | 11/2011 | Yamakami | H01R 13/6471 | 439/108 |
| 8,057,263 B1 * | 11/2011 | Howard | H01R 12/721 | 439/631 |
| 8,262,401 B1 * | 9/2012 | Byrne | H01R 25/162 | 439/215 |
| 8,366,451 B2 * | 2/2013 | Littek | H01R 13/113 | 439/12 |
| 8,998,618 B2 * | 4/2015 | Hashiguchi | H01R 13/113 | 439/787 |
| 9,800,004 B1 * | 10/2017 | Schepis | H01R 4/305 | |
| 10,522,945 B2 * | 12/2019 | Schneider | H01R 13/10 | |
| 10,873,146 B2 * | 12/2020 | Zou | H05K 1/0213 | |
| 10,998,675 B2 * | 5/2021 | Lynch | H01R 13/112 | |
| 2012/0156909 A1 * | 6/2012 | Tyler | H01R 13/6315 | 439/259 |

* cited by examiner

ELECTRICAL CONNECTOR WITH STACKED CONDUCTIVE SHEET TERMINALS

CROSS-REFERENCE TO RELATED APPLICATION

This application claims the benefit of the filing date under 35 U.S.C. § 119(a)-(d) of Chinese Patent Application No. 201911270316.1, filed on Dec. 5, 2019.

FIELD OF THE INVENTION

The present invention relates to an electrical connector and, more particularly, to an electrical connector adapted to connect one or two bus bars for carrying a large current.

BACKGROUND

In order to facilitate connection, an electrical connector is usually used to realize an electrical connection between a plate-like bus bar for carrying a large current and another plate-like bus bar or cable. In order to meet the requirement of being able to transmit the large current such as a direct current of 100 A or more, or an alternating current of 45 A or more, the electrical connector generally comprises upper and lower sheet conductive terminals adapted to clamp the bus bar. Each of the sheet conductive terminals is made of a single piece of extension conductive component, and each conductive terminal includes a main body extending in a plane perpendicular to a clamping direction in which the bus bar is clamped, and a plurality of curved cantilevers, on which electrical contacts are formed.

In the existing electrical connector with upper and lower conductive terminals, the curved cantilever provides fewer electrical contacts, for example, 24 electrical contacts. According to circuit parallel principle, a contact resistance generated by the 24 electrical contacts is relatively large. In addition, a clamping force for clamping the bus bar is provided by the curved cantilever extending in a plane substantially parallel to the bus bar, and the clamping force is insufficient.

SUMMARY

An electrical connector includes a plurality of sheet terminals each having a main body and at least a pair of cantilevers. Each pair of the cantilevers extends from at least one of a first side and an opposite second side of the main body and has a pair of contact portions protruding toward each other inside a pair of free ends of the pair of cantilevers. The plurality of sheet terminals are assembled together in a stacked manner and a receiving chamber with an insertion opening is formed between the pair of cantilevers of the plurality of sheet terminals.

BRIEF DESCRIPTION OF THE DRAWINGS

The invention will now be described by way of example with reference to the accompanying Figures, of which.

DETAILED DESCRIPTION OF THE EMBODIMENTS

The technical solution of the disclosure will be described hereinafter in further detail with reference to the following embodiments, taken in conjunction with the accompanying drawings. In the description, the same or similar reference numerals indicate the same or similar parts. The description of the embodiments of the disclosure hereinafter with reference to the accompanying drawings is intended to explain the general inventive concept of the disclosure and should not be construed as a limitation on the disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

Figure 1:
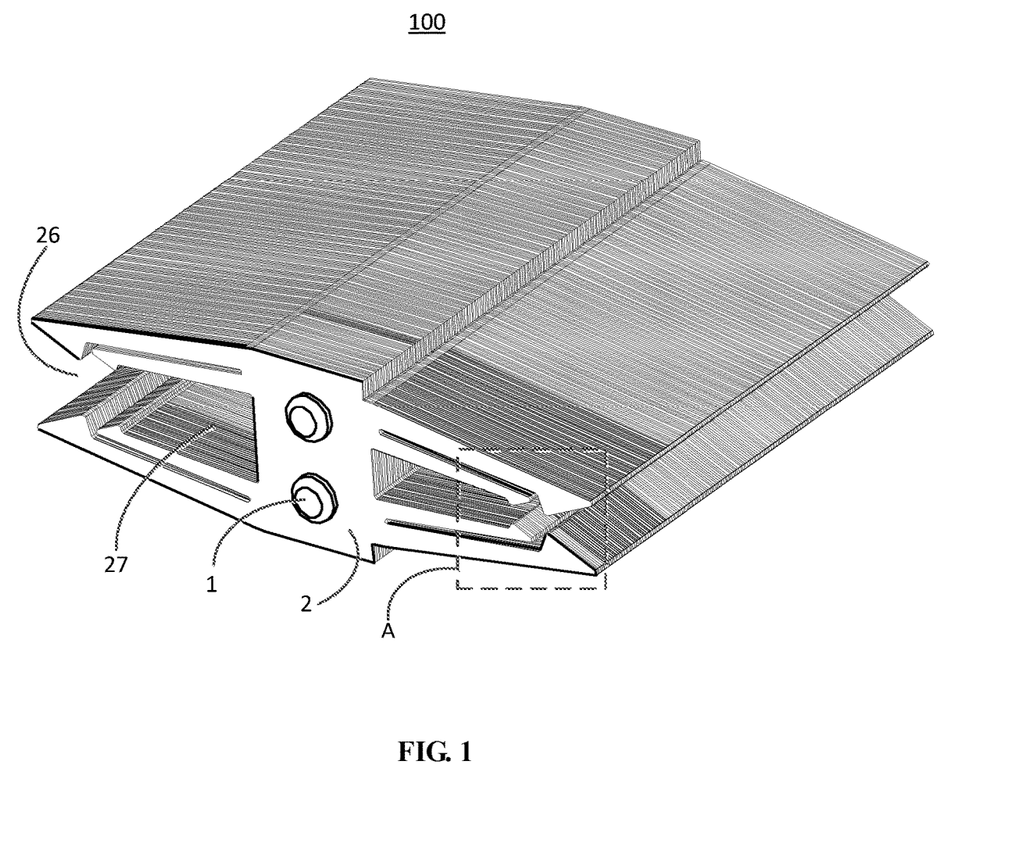
FIG. 1 is a perspective view of an electrical connector according to an embodiment.
Figure 2:
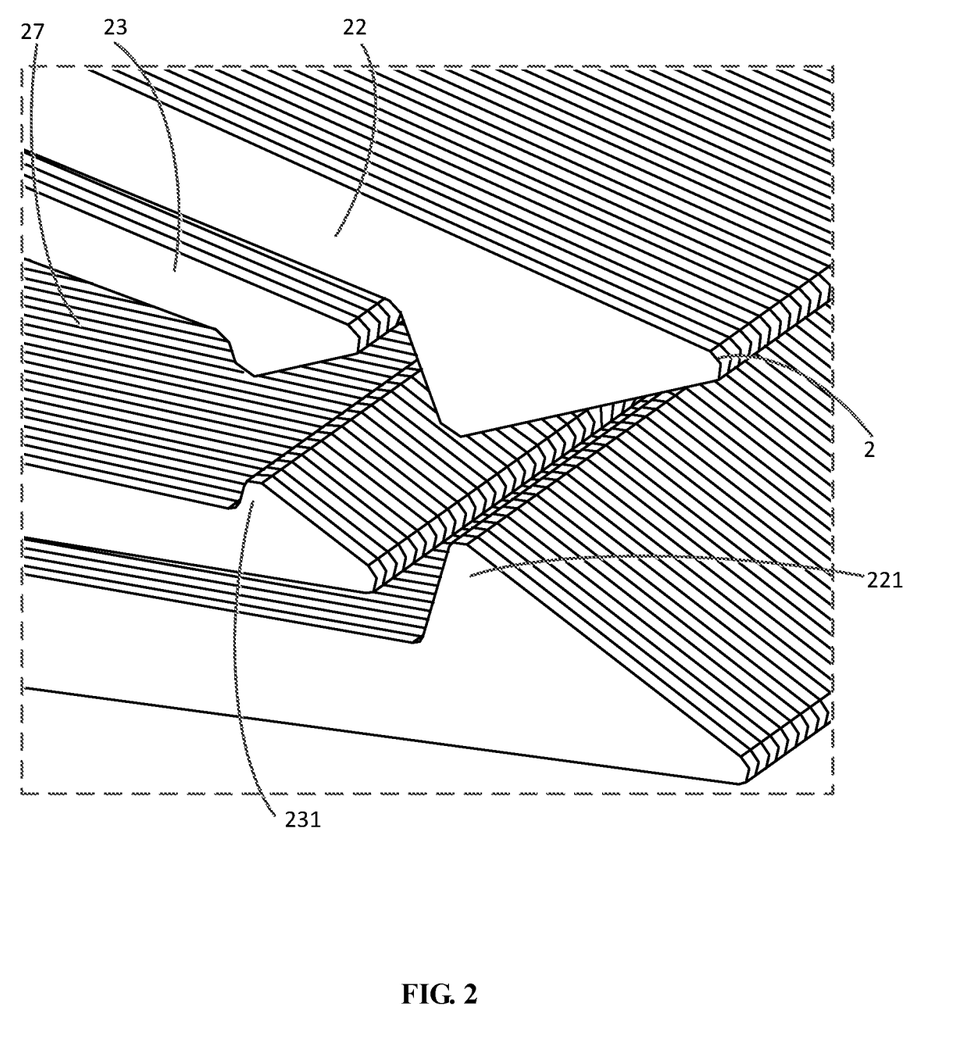
FIG. 2 is an enlarged view of a part A of FIG. 1.

As shown in FIGS. 1 and 2, an electrical connector 100 according to an exemplary embodiment of the disclosure comprises a plurality of sheet terminals 2.

In an exemplary embodiment of the disclosure, as shown in FIGS. 1 to 4, each of the sheet terminals 2 is made of, for example, a copper sheet and comprises a flat main body 21 and at least a pair of cantilevers 22, 23, 24, 25. The main body 21 is provided with at least one through hole 211 with which the plurality of sheet terminals 2 stacked together are aligned. Each pair of the cantilevers 22, 23, 24, 25 extends from at least one of opposite first and second sides of the main body 21 and is provided with contact portions 221, 231, 241, 251 protruding toward each other inside of free ends thereof.

The plurality of sheet terminals 2 are assembled together in a stacked manner, and a receiving chamber 27 with an insertion opening 26 is formed between the pair of cantilevers 22, 23, 24, 25 of the plurality of sheet terminals 2, as shown in FIGS. 1-4. A plate-like bus bar 10, 20 is inserted into the receiving chamber 27 through the insertion opening 26 and clamped between the pair of cantilevers 22, 23, 24, 25 so as to realize an electrical connection between the bus bar 10, 20 and the electrical connector 100. The plate-like bus bar 10, 20 is clamped between the pair of cantilevers 22, 23, 24, 25 of the plurality of sheet terminals 2, it is thus possible to reduce a contact resistance between the sheet terminal 2 and the clamped plate-like bus bar 10, 20 and increase a clamping force applied to the bus bar 10, 20.

In an exemplary embodiment of the disclosure, the electrical connector 100 further comprises at least one connection rod 1 configured to pass through the through hole 211 provided in the main body 21 of each sheet terminal 2 to assemble the plurality sheet terminals 2 together, as shown in FIG. 1. The connection rod 1 may be fixed by a screw connection, riveting, soldering or the like at both ends thereof.

Although the embodiment in which the plurality of sheet terminals 2 are assembled together by the connection rod 1 is described above, the disclosure is not limited thereto. In an alternative embodiment of the disclosure, the plurality of sheet terminals 2 may be connected together sequentially by soldering (for example, an ultrasonic soldering). In another alternative embodiment of the disclosure, the plurality of stacked sheet terminals 2 may be pressed and held in a holding frame.

Figure 3:
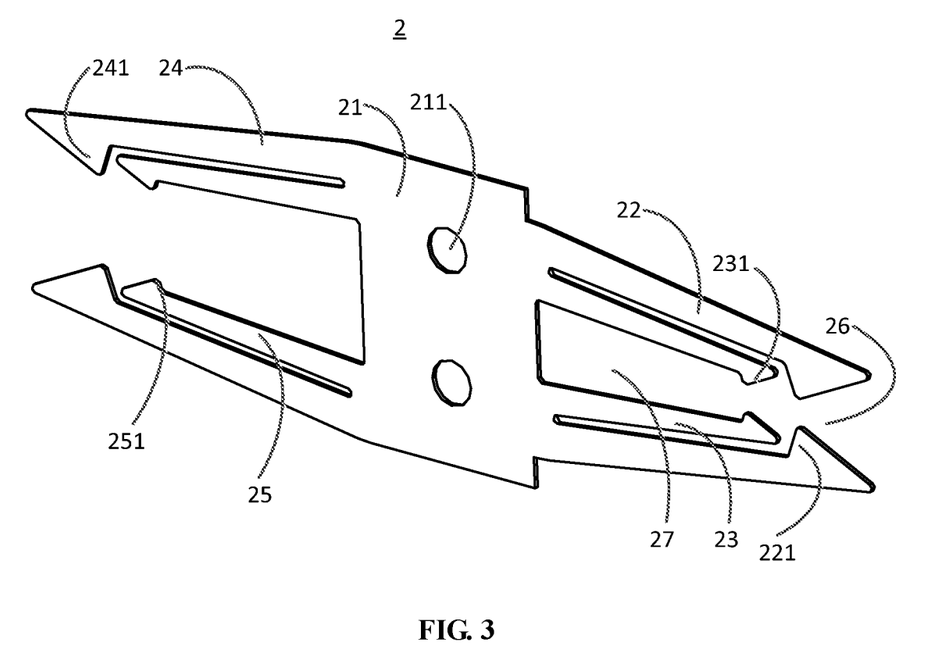
FIG. 3 is a perspective view of a sheet terminal according to an embodiment.

In an exemplary embodiment of the disclosure, as shown in FIG. 3, the at least a pair of cantilevers 22, 23, 24, 25 of each of the sheet terminals 2 comprises at least a pair of main cantilevers 22, 24 outside the sheet terminal 2. Each pair of main cantilevers 22, 24 is provided with main contact portions 221, 241 protruding toward each other inside free ends thereof. The main contact portion 221, 241 is in electrical contact with the bus bar 10, 20, thereby achieving the electrical connection between the bus bar 10, 20 and the electrical connector 100.

In an exemplary embodiment of the disclosure, as shown in FIG. 3, the at least a pair of cantilevers 22, 23, 24, 25 of each of the sheet terminals 2 further comprises at least a pair of auxiliary cantilevers 23 or 25 each disposed inside the at least a pair of main cantilevers 22 and 24. Each of the auxiliary cantilevers 23, 25 is spaced apart from the adjacent main cantilever 22, 24 to allow the auxiliary cantilever 23, 25 to move relative to the main cantilever 22, 24. Each pair of auxiliary cantilevers 23, 25 is provided with auxiliary contact portions 231 or 251 protruding toward each other inside free ends thereof. Further, a length of the auxiliary cantilever 23 or 25 extending from the first side or the second side of the main body 21 is smaller than that of the main cantilever 22, 24 extending from the first side or the second side of the main body 21. A distance between the auxiliary contact portions 231, 251 of the pair of auxiliary cantilevers 23, 25 is smaller than that between the main contact portions 221, 241 of the pair of main cantilevers 22, 24. In an alternative embodiment of the disclosure, two or three pairs of auxiliary cantilevers 23, 25 having auxiliary contact portions 231, 251 may be provided between the pair of main cantilevers 22, 24 to increase the electrical contact with the bus bar 10, 20.

Figure 4:
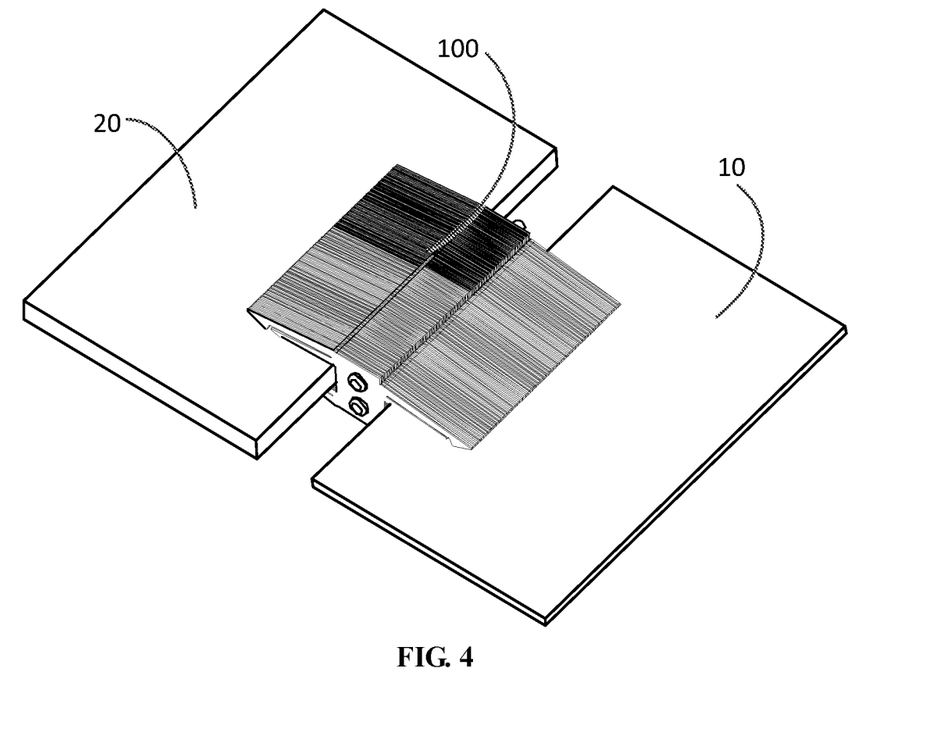
FIG. 4 is a perspective view of the electrical connector of FIG. 1 clamped to a pair of bus bars.

In this way, during inserting the bus bar 10 or 20 into the electrical connector 100, as shown in FIGS. 3 and 4, the bus bar 10, 20 firstly passes through the main contact portions 221, 241 of the main cantilever 22 or 24 and is brought in contact with the auxiliary contact portions 231, 251 so that the auxiliary cantilever 23 or 25 is biased outwardly. Thereafter, the bus bar 10 or 20 is brought in contact with the main contact portions 221, 241 so that the bus bar 10 or 20 is held within the receiving chamber 27 formed by the plurality of cantilevers 22, 23, 24, 25.

In an exemplary embodiment of the disclosure, as shown in FIGS. 2 and 3, the contact portions 221, 241, 231, 251 of the plurality of sheet terminals 2 are arranged in rows in a direction parallel to the connection rod 1 so that the contact portions 221, 241, 231, 251 in each row are in contact with the bus bar 10, 20 at the same time.

In an exemplary embodiment of the disclosure shown in FIG. 3, in each sheet terminal 2, the at least a pair of main cantilevers 22, 24 includes a pair of first main cantilevers 22 provided on the first side of the main body 21, and the at least a pair of auxiliary cantilevers 23, 25 includes a pair of first auxiliary cantilevers 23 provided inside the pair of first main cantilevers 22. In this way, there are four contact portions to be in contact with the bus bar 10 on the first side of the main body 21 of each sheet terminal 2.

In an exemplary embodiment of the disclosure shown in FIG. 3, in each of the sheet terminals 2, the at least one pair of main cantilevers 22, 24 includes a pair of second main cantilevers 24 provided on the second side of the main body 21. Further, the at least one pair of auxiliary cantilevers 23, 25 includes a pair of second auxiliary cantilevers 25 provided inside the pair of second main cantilevers 24. In this way, there are four contact portions to be in contact with the bus bar 20 on the second side of the main body 21 of each sheet terminal 2.

In the embodiment shown in FIGS. 1-4, two bus bars 10, 20 may be electrically connected to the first side and the second side of the electrical connector 100, respectively, thereby achieving the electrical connection between the two bus bars 10, 20. The bus bar 10, 20 may transmit a large current such as a direct current of 100 A or more, or an alternating current of 45 A or more.

In the electrical connector 100 of the embodiment shown in FIGS. 1-4, the plurality of stacked sheet terminals 2 are assembled together by the connection rod 1, and each pair of cantilevers 22, 23, 24, 25 has one or more elastic contact portions 221, 231, 241, 251 to be connected with the bus bar 10, 20. An appropriate number of sheet terminals 2 may be selected and the sheet terminals 2 are stacked together in a limited space according to a size of a working space. The one or more elastic contact portions 221, 231, 241, 251 provided on each pair of cantilevers 22, 23, 24, 25 double the number of the contact portions 221, 231, 241, 251 of the electrical connector 100 to be in contact with the bus bar 10, 20. It should be understood that these elastic contact portions 221, 231, 241, 251 are connected in parallel in a connection circuit. According to the principle of the parallel circuit, the contact resistance formed by one contact portion 221, 231, 241, 251 may be relatively large. However, the parallel connection of the plurality of identical contact portions 221, 231, 241, 251 may significantly reduce the contact resistance.

For example, in the electrical connector 100 shown in FIGS. 1 to 4, the first main cantilever 22 and the first auxiliary cantilever 23 on the first side of the sheet terminal 2 are provided with four contact portions. If the electrical connector 100 includes two hundred sheet terminals 2, the sheet terminal 2 will be provided with eight hundred contact portions to be electrically connected to the bus bar 10 on the first side thereof. Generally, the contact resistance of the electrical connection of one contact portion with the bus bar 10 is 0.55 milliohms. Thus, the total contact resistance generated by the two hundred sheet terminals 2 of the electrical connector 100 is:

$$0.55/(200*4)=0.0006875 (\text{milliohm}).$$

On the other hand, in a conventional electrical connector having two upper and lower conductive terminals, each conductive terminal comprises a main body extending in a plane perpendicular to the clamping direction in which the clamping bus bar is clamped, and twelve curved cantilevers extending from the main body. Each of the curved cantilevers is provided with a contact portion. In this way, the conventional electrical connector has twenty four contact portions to be in electrical contact with the bus bar, and the total contact resistance is 0.0208 milliohms. Therefore, the electrical connector 100 according to the embodiment of the disclosure significantly reduces the contact resistance of electrical contact with the bus bar.

Further, since the cantilevers 22, 23, 24, 25 (the main cantilever and the auxiliary cantilever) of each sheet terminal 2 of the electrical connector 100 extend in the plane perpendicular to the bus bar 10, 20, each cantilever 22, 23, 24, 25 may provide a larger elastic clamping force to the bus bar 10, 20. In this way, the bus bar 10, 20 may be reliably clamped in the receiving chamber 27, and each contact portion 22, 23, 24, 25 may be kept to be reliably electrically connected to the bus bar 10, 20, thereby improving the electrical transmission performance of the electrical connector 100.

Figure 5:
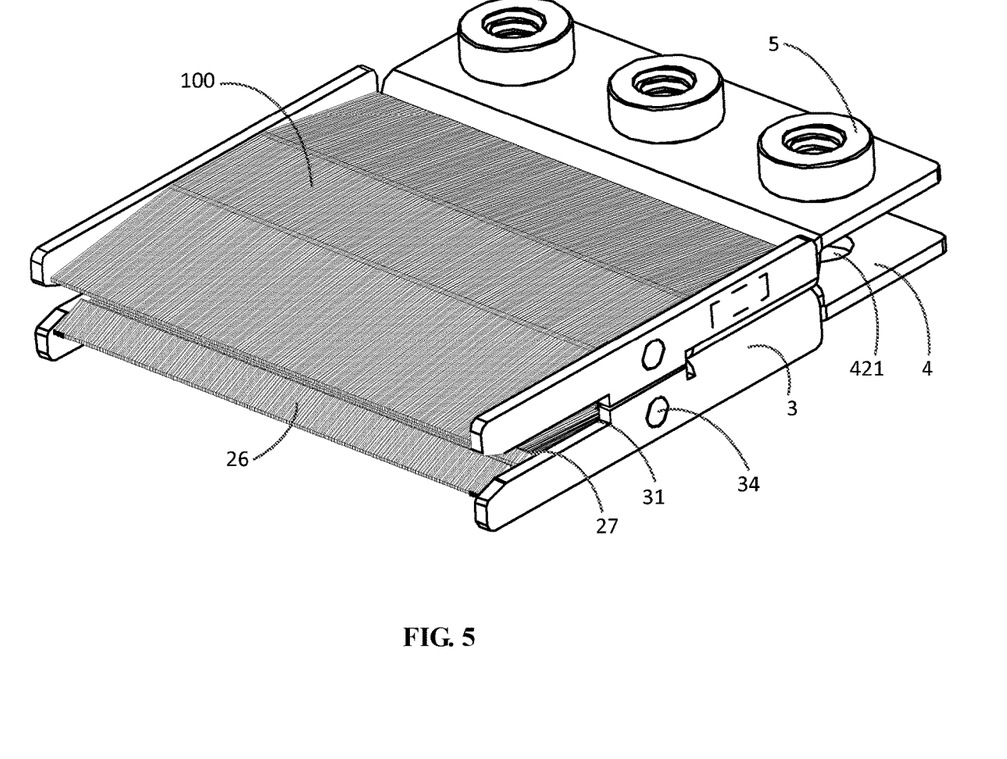
FIG. 5 is a perspective view of an electrical connector according to another embodiment.
Figure 6:
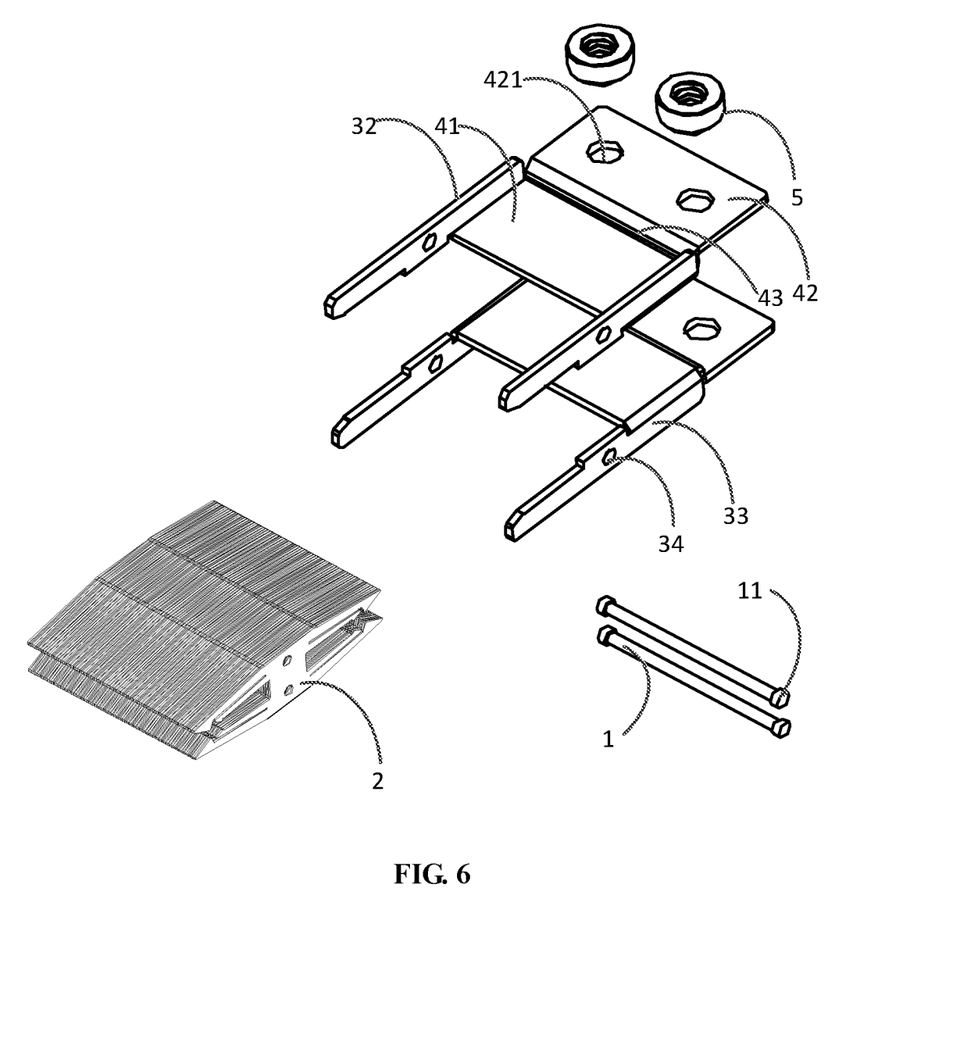
FIG. 6 is an exploded perspective view of the electrical connector of FIG. 5.
Figure 7:
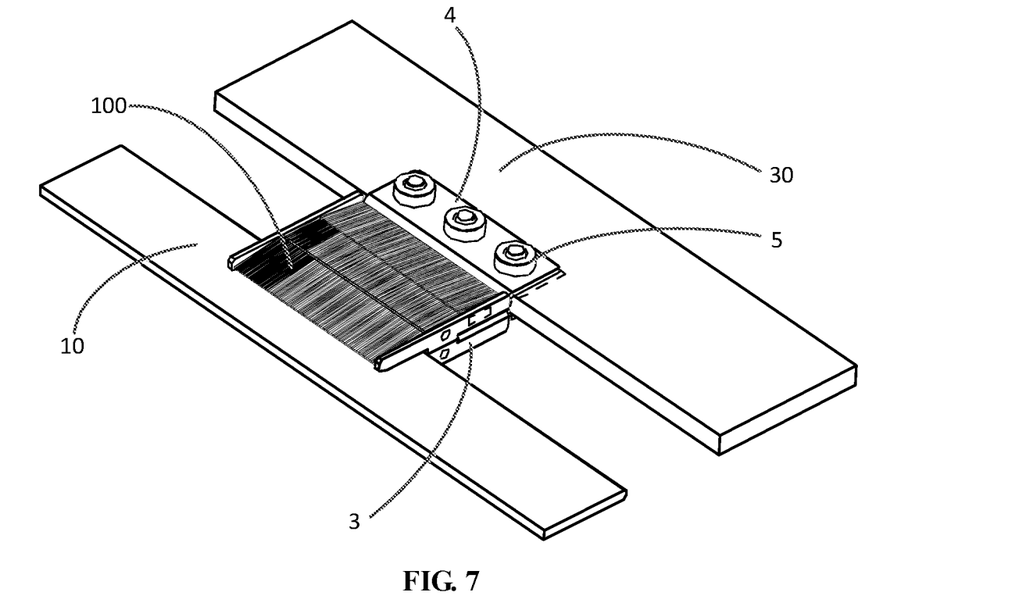
FIG. 7 is a perspective view of the electrical connector of FIG. 5 clamped to a pair of bus bars.

In another exemplary embodiment of the disclosure, as shown in FIG. 5-7, the electrical connector 100 further comprises two protective frames 3 each mounted outside the two outermost sheet terminals 2 by the connection rod 1. In this way, the sheet terminals 2 may be protected.

In an exemplary embodiment of the disclosure, each of the protective frames 3 is provided with an auxiliary slot 31 communicating with the receiving chamber 27 between the pair of cantilevers 22, 23, 24, 25 on at least one end thereof, as shown in FIG. 5. In this way, a width of the connected bus bar 10 may be allowed to be greater than that of the electrical connector 100, and the bus bar 10 may pass through the receiving chamber 27 and the auxiliary slot 31 in the width direction of the electrical connector 100.

In another exemplary embodiment of the disclosure, as shown in FIGS. 5-7, each of the protective frames 3 comprises an upper frame 32 and a lower frame 33 each mounted outside the two outermost sheet terminals 2 by the connection rod 1 passing through a through-hole 34 in each of the frames 32, 33. The connection rod 1 is connected to the protective frame 3 by a nut 11 on at least end thereof. Further, an extended conductive component 4 is mounted at an end of the protective frame 3 to be electrically connected with the cantilevers 22, 23, 24, 25 of the plurality of sheet terminals 2 on the second side. The bus bar 10, 20 or other conductive components such as cables may be electrically connected by the extended conductive member 4.

In an exemplary embodiment of the disclosure, as shown in FIGS. 5-7, the extended conductive component 4 comprises two conductive plates. Each of the conductive plates includes a clamped portion 41 inserted and clamped between the pair of cantilevers 22, 23, 24, 25 of the plurality of sheet terminals 2, a clamping portion 42 provided outside the plurality of sheet terminals 2 and configured to clamp the plate-like bus bar 30, and a transition portion 43 integrally connected between the clamping portion 41 and the clamped portion 42 so that the two clamped portions 41 are brought in contact with each other and the two clamping portions 42 are separated from each other. The bus bar 30 is fixed between the clamping portions 42 by bolt members 5 and through holes 421 provided in the clamping portion 42 to be electrically connected to the electrical connector 100.

In an exemplary embodiment, a distance between the clamping portions 42 of the two conductive plates is greater than a maximum distance between the pair of cantilevers 22, 23, 24, 25. In this way, a thickness of the bus bar 30 clamped between the clamping portions 42 may be allowed to be greater than that of the bus bar 10 or 20 clamped between the cantilevers 22, 23, 24, 25.

In a case where a current from a main conductive path needs to be shunted into one or more sub-conductive paths, one or more electrical connectors 100 according to the embodiments of the disclosure may be used to carry larger current and electrically connect the bus bar 30 of larger thickness to one or more bus bars 10 for carrying branch currents and having a smaller thickness. The distance between the clamping portions 42 of the two conductive plates of the extended conductive component 4 may be changed as desired so that the extended conductive component 4 is electrically connected with the bus bars 10, 20, 30 having different thicknesses, thereby increasing the application range of the electrical connector 100.

Figure 8:
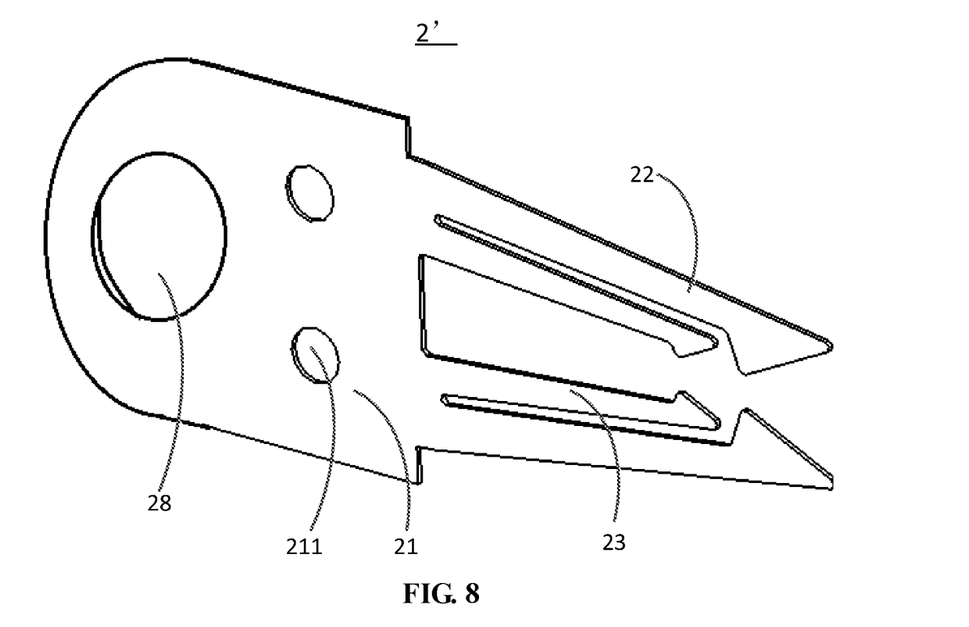
FIG. 8 is a perspective view of a sheet terminal according to another embodiment.

In a sheet terminal 2' according to another embodiment, as shown in FIG. 8, the main body 21 of each sheet terminal 2' is provided with a connection hole 28 at the second side thereof, and the connection holes 28 of the plurality of sheet terminals 2 are aligned with each other. The cantilever of the sheet terminal 2' of the embodiment shown in FIG. 8 on the first side has the same structure as that of the sheet terminal 2 of the embodiment shown in FIG. 3. That is, in each of the sheet terminals 2', the main body 21 is provided with a pair of first main cantilevers 22 on the first side thereof, and a pair of first auxiliary cantilevers 23 is provided inside the pair of first main cantilevers 22. In this way, there are four contact portions to be in contact with the bus bar 10 on the first side of the main body 21 of each of the sheet terminal 2'.

The plurality of stacked sheet terminals 2' are assembled together by the connection rod 1 passing through the through hole 211 of each of the sheet terminal 2' to form the electrical connector according to another embodiment of the disclosure. The bus bar may be connected at the first side of the plurality of sheet terminals 2', and a cable or a conductive rod may be electrically connected at the second side of the plurality of sheet terminals 2' through the connection hole 28 by welding or screwing, thereby realizing the electrical connection between the bus bar and the cable.

As shown in FIGS. 1-8, each pair of cantilevers 22, 23, 24, 25 is configured to be symmetrical about a plane between the pair of cantilevers 22, 23, 24, 25. In this way, the electrical connector 100 may be mounted properly without taking inconsideration of an upper or lower structure thereof. The bus bar 10, 20 thus may be easily inserted into the electrical connector 100.

It should be appreciated by those skilled in this art that the above embodiments are intended to be illustrative, and many modifications may be made to the above embodiments by those skilled in this art. Further, various structures described in various embodiments may be freely combined with each other without conflicting in configuration or principle.

Although the disclosure has been described hereinbefore in detail with reference to the attached drawings, it should be appreciated that the disclosed embodiments in the attached drawings are intended to illustrate embodiments of the disclosure by way of example, and should not be construed as limiting the disclosure.

Although a few embodiments of the general inventive concept of the disclosure have been shown and described, it would be appreciated by those skilled in the art that changes or modifications may be made to these embodiments without departing from the principles and spirit of the general inventive concept, the scope of which is defined by claims and their equivalents.

It should be noted that, the word "comprise" doesn't exclude other elements or steps, and the word "a" or "an" doesn't exclude more than one. In addition, any reference numerals in the claims should not be interpreted as the limitation to the scope of the disclosure.

What is claimed is:
1. An electrical connector, comprising:
   a plurality of sheet terminals each including:
      a main body;
      a pair of first main cantilevers extending from a first side of the main body and having a pair of contact portions protruding toward each other inside a pair of free ends of the pair of first main cantilevers;

a pair of auxiliary cantilevers inside the pair of first main cantilevers;

a pair of second main cantilevers extending from a second side of the main body opposite the first side; and a pair of protective frames each mounted outside a pair of outermost sheet terminals of the plurality of sheet terminals, the plurality of sheet terminals are assembled together in a stacked manner and a receiving chamber with an insertion opening is formed between at least one of the pair of first or second main cantilevers of the plurality of sheet terminals.

2. The electrical connector of claim 1, further comprising a pair of connection rods each passing through a through hole in the main body of each sheet terminal to assemble the plurality of sheet terminals together.

3. The electrical connector of claim 2, wherein the contact portions of the plurality of sheet terminals are arranged in rows in a direction parallel to the connection rod.

4. The electrical connector of claim 1, wherein each of the auxiliary cantilevers is spaced apart from an adjacent first main cantilever, and each pair of auxiliary cantilevers have a pair of auxiliary contact portions protruding toward each other inside a pair of free ends of the pair of auxiliary cantilevers.

5. The electrical connector of claim 4, wherein each of the auxiliary cantilevers has a length smaller than a length of the adjacent first main cantilever.

6. The electrical connector of claim 5, wherein a distance between the auxiliary contact portions of the pair of auxiliary cantilevers is smaller than a distance between the main contact portions of the pair of first main cantilevers.

7. The electrical connector of claim 1, wherein, in each of the sheet terminals, the pair of auxiliary cantilevers includes a pair of second auxiliary cantilevers provided inside of the pair of second main cantilevers.

8. The electrical connector of claim 1, wherein each of the protective frames has an auxiliary slot on an end communicating with the receiving chamber between the pair of cantilevers.

9. The electrical connector of claim 1, wherein each of the protective frames has an upper frame and a lower frame each mounted outside the pair of outermost sheet terminals.

10. The electrical connector of claim 1, wherein an extended conductive component is mounted at an end of one of the protective frames to be electrically connected with the cantilevers on a side of the plurality of sheet terminals.

11. The electrical connector of claim 10, wherein the extended conductive component includes a pair of conductive plates, each of the conductive plates has a clamped portion clamped between one of the pair of first or second main cantilevers of the plurality of sheet terminals, a clamping portion provided outside the plurality of sheet terminals and configured to clamp a plate-like bus bar, and a transition portion integrally connected between the clamping portion and the clamped portion.

12. The electrical connector of claim 11, wherein the clamped portions contact each other and the clamping portion are separated from each other.

13. The electrical connector of claim 12, wherein a distance between the clamping portions of the conductive plates is greater than a maximum distance between the pair of first or second main cantilevers.

14. The electrical connector of claim 1, wherein the main body of each sheet terminal has a connection hole, the connection holes of the plurality of sheet terminals are aligned with each other.

15. The electrical connector of claim 1, further comprising a pair of connection rods each passing through a through hole in the main body of each sheet terminal to assemble the plurality of sheet terminals together, each protective frame including at least one through hole aligned with a corresponding one of the through holes of the main body and receiving a corresponding one of the connection rods for securing the protective frames to the plurality of sheet terminals.

16. The electrical connector of claim 1, wherein each sheet terminal, including the main body, the pair of first main cantilevers, and the pair of first auxiliary cantilevers, is formed from a discrete sheet of generally planar conductive material.

17. An electrical connector, comprising:

a plurality of sheet terminals each including a main body and at least a pair of cantilevers, each pair of the cantilevers extending from at least one of a first side and an opposite second side of the main body and having a pair of contact portions protruding toward each other inside a pair of free ends of the pair of cantilevers, the plurality of sheet terminals are assembled together in a stacked manner and a receiving chamber with an insertion opening is formed between the pair of cantilevers of the plurality of sheet terminals;

a pair of protective frames each mounted outside a pair of outermost sheet terminals of the plurality of sheet terminals, each of the protective frames has an upper frame and a lower frame each mounted outside the pair of outermost sheet terminals;

an extended conductive component mounted at an end of one of the protective frames to be electrically connected with the cantilevers on a side of the plurality of sheet terminals, the extended conductive component including a pair of conductive plates, each of the conductive plates has a clamped portion clamped between the pair of cantilevers of the plurality of sheet terminals, a clamping portion provided outside the plurality of sheet terminals and configured to clamp a plate-like bus bar, and a transition portion integrally connected between the clamping portion and the clamped portion.

* * * * *